May 28, 1963   A. MANGANELLI   3,091,145
FLASH TRIMMING TOOL FOR NON-CIRCULAR TUBULAR MEMBERS
Filed March 15, 1960

INVENTOR
ALFREDO MANGANELLI
BY Cushman, Darby & Cushman
ATTORNEYS

United States Patent Office

3,091,145
Patented May 28, 1963

3,091,145
FLASH TRIMMING TOOL FOR NON-CIRCULAR TUBULAR MEMBERS
Alfredo Manganelli, Proctor, Vt., assignor to Vermont Marble Company, Proctor, Vt., a corporation of Vermont
Filed Mar. 15, 1960, Ser. No. 15,120
9 Claims. (Cl. 83—184)

This invention relates to a flash trimming tool, and more particularly to a tool for shearing excess material from the open end of a noncircular tubular member.

The conventional way to trim the end of a noncircular tube member is to cut or radially shear the open end of the tubular member by a reciprocating saw or a shearing blade. During such operation if the tubular member is made of a soft metal, the end may collapse or become deformed and will subsequently have to be restored to its desired configuration. The tool of this invention is specifically designed to remove the excess or waste material from the open end of an extruded aluminum or other soft metal irregular tubular member. The particular tool comprises a holder upon the central axis of which is mounted a noncircular shearing edge which also carries adjustable and radially protruding slitting knives. The shearing edge with the blades is keyed to the tool holder and is secured thereto by means of a suitable fastening element. Also secured to the holder and adapted to relatively rotate about the fastening element with respect to the holder and shearing edge is a pilot chuck. In operation, a tubular member having a noncircular cross-section is chucked or clamped inside a guide chuck having an aperture of the same noncircular configuration defining a female shearing edge which is positioned an appropriate distance from the end of the member to be trimmed. The tool is then advanced nonrotatively into the open end of the tubular member so that the pilot chuck enters the interior of the member to "size the inside of the tube." The nonrotative advance is continued until the tool shearing edge is even with the guide chuck shearing edge and the pilot chuck is disposed interiorly of the tube to be trimmed. During the nonrotative advance of the tool the slitting knives part the excess material of the tubular member at diametrically opposed points from the end thereof to the desired shear line. Upon completion of the nonrotative movement of the tool the tool shearing edge and holder are rotated 180° so that the tool shearing edge crosses over the guide chuck shearing edge to circumferentially shear the excess material. During the revolution of the holder and shearing edge the pilot chuck does not rotate but remains stationary within the tubular member, thus preventing any collapse during the trimming or shearing process.

It is an object, therefore, of this invention to provide a trimming tool for shearing the open end of a noncircular tubular member.

It is another object of this invention to provide an improved method for trimming the open end of a noncircular tubular member.

It is a further object of this invention to provide a trimming tool to circumferentially shear excess material from the open end of a noncircular tubular member.

A still further object of this invention is to provide in a trimming tool for trimming excess material from the open end of a noncircular tubular member and having means to prevent the deformation of the end to be trimmed during the shearing operation.

It is an additional object of this invention to provide a trimming tool for shearing excess material from the open end of a noncircular tubular member in combination with a noncircular guide chuck whereby the excess material is circumferentially sheared from the tubular member without deforming the trimmed end.

These and further objects and advantages will become readily apparent to those skilled in the art upon reading the following detailed description taken in conjunction with the appended drawings in which.

Figure 1:
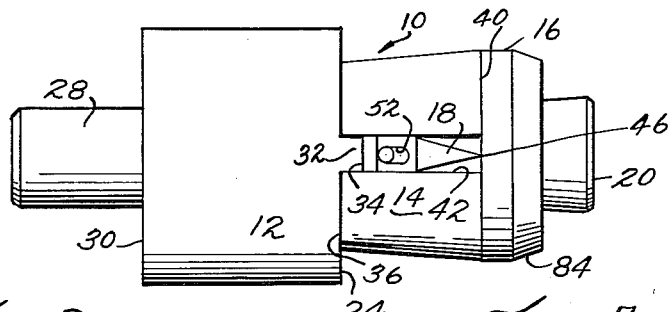
FIGURE 1 is a top plan view of the device of this invention.
Figure 2:
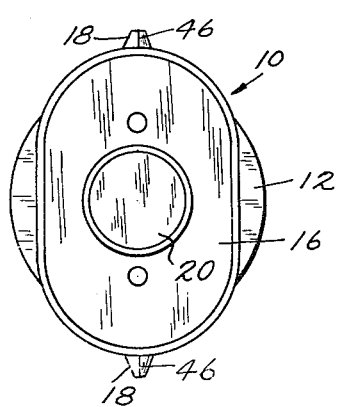
FIGURE 2 is an end elevational view of the device of FIGURE 1 looking from the right.

Referring now to the drawing, and particularly to FIGURES 1 and 2, there is shown an exemplary embodiment of the trimming tool of this invention. The trimming tool 10 comprises a cylindrical tool holder 12 to which is coaxially mounted and keyed a frusto-conical shearing member 14 which has a noncircular right cross-section (best shown in FIGURE 2). Coaxially mounted with the shearing member 14 and adapted for rotation relative thereto is a disc pilot chuck 16 having a similar noncircular cross-sectional configuration. The shearing member 14 is also provided with radially protruding and axially extending adjustable slitting blades 18 spaced diagonally opposite from each other (FIGURE 2). The pilot chuck 16 and shearing member 14 are mounted upon the tool holder 12 by a stud 20.

Figure 3:
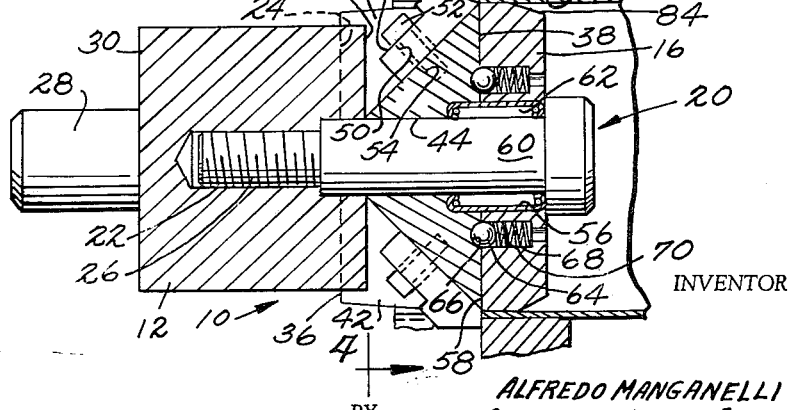
FIGURE 3 is a side elevation, partially in section of the device of FIGURE 1 shown with the associated clamping chuck.

As best shown in FIGURE 3, the cylindrical tool holder 12 has an internally threaded axial bore 22 in its forward face 24 to receive the threaded end 26 of the stud 20 and has an axial extension 28 on its rearward face 30 by which it may be attached to a suitable device (not shown) to impart rotation to it. The forward face 24 of the tool holder 12 has a diagonal rib 32 which is adapted to engage a diagonal groove 34 in the rearward face 36 of the shearing member 14 to key the two together, so that when the tool holder is rotated the shearing member rotates with it. As previously mentioned, the shearing member 14 is frusto-conical and is mounted with its smaller area face, the rearward face 36 abutting the forward face 24 of the tool holder 12. The periphery of the forward face 38 of the shearing member 14 defines a shearing edge 40 which, upon rotation of the shearing member, circumferentially shears a noncircular tubular member, as will be described in detail below. The shearing member 14 is further provided with diagonally opposed notches or grooves 42 which are inclined outwardly and extend from adjacent the rearward end of the axial bore 44 of the shearing member to the shearing edge 40. The notches 42 may be coradial with the diagonal groove 34 for ease in manufacture. A slitting blade 18 is disposed in each groove 42 with its cutting edge 46 facing forward of the shearing member 14. The shank portion 48 of each slitting blade 18 has an elongated slot 50 through which extends a threaded bolt 52, with the inner end of the bolt being received in a threaded bore 54 in the shearing member 14. By this arrangement each blade 18 may be axially adjusted along the shearing member 14 so that its cutting edge 46 is positioned accurately with respect to the shearing edge 40. Preferably, the cutting edge 46 should be in exact alignment with the forward face 38 and shearing edge 40 of the shearing member 14.

The pilot chuck 16 is mounted on the stud 20, which extends through its central bore 56, so that the rearward face 58 of the pilot chuck abuts the forward face 38 of the shearing member 14. To allow for rotation of the pilot chuck 16 relative to the shearing member 14 suitable anti-friction bearing means are disposed between the smooth stud shank 60 and bore 56 of the pilot chuck. Preferably, the bearings comprise circumferentially disposed and axially extending needle bearings 62. Random rotation of the pilot chuck 16 about the stud 20 relative to the shearing member 14 is prevented by placing releasable spring-loaded balls 64 between abutting faces of the shearing member and pilot chuck. In this regard the forward face of the shearing member has hemispherical recesses 66 in its forward face in alignment with the balls 64, spring 68 and axial bores 70 of the pilot chuck so that when the balls 64 engage the recesses 66 the pilot chuck and shearing member are in exact alignment, as shown in FIGURES 1, 2 and 3. Although the pilot chuck 16 and shearing member 14 are here shown as having oval or elliptical faces, it is to be understood that these faces may be of any noncircular configuration depending upon the configuration of the tubular member to be trimmed.

In operation, then, with the tool assembled as described above, the open end of a tubular member is trimmed in the following manner. The tubular member 72 having a noncircular cross-sectional configuration is placed in a guide chuck 74 having a noncircular through-bore 76 of similar noncircular cross-sectional configuration; the rearward face 78 of the guide chuck defining a female shearing edge 80 about the periphery of the throughbore 76. The tubular member 72 is adjusted in the guide chuck 74 so that the desired length of its end 82 to be trimmed extends rearwardly of the guide chuck. The trimming tool 10 is then moved axially toward the guide chuck 74 with the pilot chuck 16 of the same noncircular shape as but slightly smaller than the tube end 82 passing axially and interiorly along the tube end. For this purpose, the forward face of the pilot chuck 16 may be bevelled, as at 84. As the tool progresses axially of the tubular member 72, the slitting blades 18 engage and axially slit the extending end portion 82 of the tubular member. Axial movement of the tool 10 is continued until the pilot chuck 16 is disposed within the tubular member 72 in alignment with the throughbore 76 of the guide chuck 74. In this position the cutting edge 46 of each slitting blade 18 is adjacent the rearward face 78 of the guide chuck 74 and the shearing edges 40 and 80 of the guide chuck 74 and shearing member 14 are in substantially the same plane, as shown in FIGURE 3. With the tool 10 in this position, the tool holder 12 and shearing member 14 are rotated about their common axis at least 180°, and due to the action of the spring-loaded balls 64 and bearings 62 the pilot chuck 16 does not rotate but remains stationary within the tube 72, thus preventing possible collapse of the tube during the shearing stage of the trimming.

Figure 4:
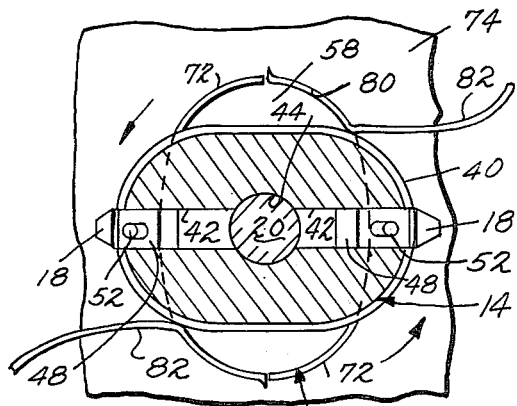
FIGURE 4 is a sectional view taken along line 4—4 of FIGURE 3, and showing the shearing member rotated 90°, from its starting point, one-half of its complete rotation of 180°.

As shown in FIGURE 4, rotation of the shearing member 14 relative to the guide chuck 74 and pilot chuck 16 causes the shearing edge 40 of the shearing member to cross the shearing edge 80 of the guide chuck to circumferentially shear the tube end 82 along a line defined by the plane of the abutting faces 38 and 58 of the shearing member 14 and pilot chuck 16. As the tubular member 72 has first been axially slit at diagonally opposed places by the slitting blades 18, rotation of the shearing member 14 180° about its axis completely shears the extending end portion 82 of the tubular member 72. It should now be clear that any noncircular tubular member 72 may be trimmed in the manner set forth above by selecting a guide chuck 74, pilot chuck 16, and shearing member 14 of the same noncircular cross-sectional configuration, since rotation of one noncircular element relative to the other causes the periphery of the one rotated to cross over the periphery of the other to create a shearing action upon a tubular member surrounding the two elements. At the first instant of rotation, the end 82 to be trimmed is first sheared a very slight distance by the protruding slitting blades 18, but upon further rotation a true shearing action occurs between the two noncircular shearing members 14 and 74, as described in detail above.

It will thus be seen that there has been provided by this invention a device in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

What is claimed is:

1. A flash trimming tool for trimming the open end of a non-circular, tubular member, comprising a guide chuck having a similar non-circular through-bore terminating in a shearing edge for receiving and retaining said tubular member with the portion to be sheared extending beyond said edge, a rotatable shearing member of similar non-circular shape adapted to enter the portion of the member to be sheared, a pilot chuck of similar non-circular shape coaxially mounted adjacent to said shearing member and means disposed between the pilot chuck and shearing member to provide relative rotation therebetween, said pilot chuck being adapted to fit within the interior of the tubular member to support the same within the guide chuck so as to position the rotatable shearing means for cooperation with the guide chuck shearing edge, and axially extending and radially protruding slitting means carried by said shearing member adjacent said pilot chuck for slitting the tubular member upon insertion of the shearing member to provide for less than complete rotation of the shearing member during severance of the tubular member.

2. The structure defined in claim 1 wherein said means providing for relative rotation between the shearing member and the pilot chuck includes releasable retaining and aligning means disposed between adjacent surfaces of said pilot chuck and said shearing member.

3. The structure defined in claim 1 in which said shearing member is frusto-conical and tapers in an axial direction away from said pilot chuck.

4. The structure defined in claim 1 in which said shearing member is provided with an axial notch and said slitting means comprises a blade mounted in said notch, the edge of said blade being in alignment with the cooperating surfaces of said pilot chuck and said shearing member.

5. The combination with a guiding and shearing chuck having a non-circular aperture therethrough adapted to receive and retain a similarly shaped non-circular tubular member with the portion to be sheared projecting therebeyond, of a flash trimming tool for trimming the projecting open end of the non-circular member, said tool comprising a non-circular rotatable shearing member similar in shape to the aperture and the tubular member and adapted to enter the projecting open end of the latter, a pilot chuck of similar non-circular shape coaxially mounted with the shearing member and rotatable relative thereto and adapted for axial movement therewith toward the chuck to fit within and engage the interior of the tubular member within the chuck, and axially extending and radially protruding slitting means carried by said shearing member adjacent the pilot chuck, said rotatable shearing member upon rotation thereof being adapted to cooperate with the guiding and shearing chuck to shear the slitted projecting end of the tubular member.

6. The structure defined in claim 5 including releasable retaining and aligning means disposed between adjacent surfaces of said pilot chuck and said shearing member.

7. The structure defined in claim 5 in which said shearing member is frusto-conical and tapers in an axial direction away from said pilot chuck.

8. The structure defined in claim 5 in which said shearing member is provided with an axial notch and said slitting means comprises a blade mounted in said notch, the edge of said blade being in alignment with the cooperating surfaces of said pilot chuck and said shearing member.

9. A flash trimming tool for trimming the open end of a tubular member having a non-circular cross-sectional configuration comprising, means externally retaining a portion of the non-circular tubular member adjacent its open end with the portion to be trimmed projecting therebeyond, means for internally supporting the externally retained portion of the member, means supported for movement toward the retaining means for axially slitting the projecting portion of the member from its open end to adjacent its retained and supported portion, and means supported for movement with said slitted means and adapted to enter the open end of the member and having a non-circular shearing edge corresponding in shape thereto, mounted for rotation with respect thereto, and adapted to cooperate with the external retaining means to shear the projecting portion of the member adjacent its retained portion.

References Cited in the file of this patent

UNITED STATES PATENTS

| | | |
|---|---|---|
| 593,533 | Campbell | Nov. 9, 1897 |
| 1,965,228 | Gabriel | July 3, 1934 |
| 2,320,272 | Friden | May 25, 1943 |
| 2,702,597 | Wickwire et al. | Feb. 22, 1955 |
| 2,704,124 | Koster | Mar. 15, 1955 |
| 2,776,003 | Koster | Jan. 1, 1957 |